United States Patent
Shao et al.

(10) Patent No.: US 12,266,041 B2
(45) Date of Patent: Apr. 1, 2025

(54) INTERACTION METHOD FOR DISPLAYING A CONTROL COMPONENT BASED ON A TRIGGER OPERATION IN MULTIMEDIA CONTENTS

(71) Applicant: Beijing Zitiao Network Technology Co., Ltd., Beijing (CN)

(72) Inventors: Ziyu Shao, Beijing (CN); Shiting Zhou, Beijing (CN); Pengwei Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/395,258

(22) Filed: Dec. 22, 2023

(65) Prior Publication Data

US 2024/0127518 A1    Apr. 18, 2024

Related U.S. Application Data

(63) Continuation of application No. PCT/CN2022/105606, filed on Jul. 14, 2022.

(30) Foreign Application Priority Data

Aug. 30, 2021    (CN) .......................... 202111006308.3

(51) Int. Cl.
*G06T 13/00*    (2011.01)
*G06F 3/0484*    (2022.01)
(52) U.S. Cl.
CPC ............ *G06T 13/00* (2013.01); *G06F 3/0484* (2013.01); *G06T 2200/24* (2013.01)
(58) Field of Classification Search
None
See application file for complete search history.

(56) References Cited

U.S. PATENT DOCUMENTS

2003/0181230 A1*    9/2003    Shimoda ................. A63F 13/12
                                                                                   463/7
2013/0085018 A1*    4/2013    Jensen .................. A63F 13/812
                                                                                  473/404

(Continued)

FOREIGN PATENT DOCUMENTS

CN    110493630 A    11/2019
CN    111225226 A    6/2020

(Continued)

OTHER PUBLICATIONS

ISA China National Intellectual Property Administration, International Search Report Issued in Application No. PCT/CN2022/105606, Sep. 29, 2022, WIPO, 4 pages.

(Continued)

*Primary Examiner* — Jeffrey J Chow
(74) *Attorney, Agent, or Firm* — Alleman Hall & Tuttle LLP (57) ABSTRACT

The present disclosure relates to an interaction method and apparatus, an electronic device, a readable storage medium, and a program product. The interaction method comprises: during the process of playing multimedia content, in response to a trigger operation for a target virtual gift in a virtual gift display interface, displaying a control component, and a first object and a second object which are comprised in the target virtual gift, wherein the control component is used for controlling a path for the target virtual gift; according to the state of the control component, determining a target path corresponding to the first object; and controlling the first object to move along the target path, and when the first object hits the second object during the process of movement, playing, at a position where the second object is hit, a first special effect corresponding to the second object.

20 Claims, 6 Drawing Sheets

(56) References Cited

U.S. PATENT DOCUMENTS

| | | | |
|---|---|---|---|
| 2018/0098028 A1 | 4/2018 | Mu | |
| 2019/0196690 A1* | 6/2019 | Chong | G06F 3/04815 |
| 2019/0299093 A1* | 10/2019 | Kamfjord | A63F 13/573 |
| 2020/0336804 A1* | 10/2020 | Cui | H04N 21/4781 |
| 2021/0134041 A1* | 5/2021 | Yasukawa | A63F 13/428 |
| 2022/0414962 A1* | 12/2022 | Shirai | G06V 20/20 |
| 2023/0089143 A1* | 3/2023 | Zheng | A63F 13/86 |
| | | | 463/31 |
| 2023/0125331 A1* | 4/2023 | Li | H04N 21/478 |
| 2023/0367466 A1* | 11/2023 | Yang | G06F 3/0486 |
| 2023/0393715 A1* | 12/2023 | Jensen | G06Q 20/38 |

FOREIGN PATENT DOCUMENTS

| | | |
|---|---|---|
| CN | 111246307 A | 6/2020 |
| CN | 112584188 A | 3/2021 |
| CN | 112619134 A | 4/2021 |
| CN | 113225581 A | 8/2021 |
| JP | 6751193 B1 | 9/2020 |
| JP | 2021118540 A | 8/2021 |

OTHER PUBLICATIONS

European Patent Office, Extended European Search Report Issued in Application No. 22862909.3, Aug. 29, 2024, 9 pages.
Japan Patent Office, Office Action Issued in Application No. 2023-579852, Oct. 29, 2024, 11 pages.

* cited by examiner

INTERACTION METHOD FOR DISPLAYING A CONTROL COMPONENT BASED ON A TRIGGER OPERATION IN MULTIMEDIA CONTENTS

CROSS-REFERENCE OF RELATED APPLICATIONS

This application is a Continuation application of International Patent Application No. PCT/CN2022/105606, filed on Jul. 14, 2022, which claims priority to Chinese Application No. 202111006308.3, filed on Aug. 30, 2021, the disclosure of which is incorporated herein by reference in its entity.

FIELD

The present disclosure relates to the field of computer technology, and more specifically, to an interaction method and an apparatus, an electronic device, a readable storage medium, and a program product.

BACKGROUND

With the constant development of Internet technology, the ways for acquiring the multimedia contents by users are also constantly changing. For example, the users may watch plentiful of multimedia contents, like movies, TV dramas, song performance and entertainment programs, through live streaming provided by application programs. When the application programs display the multimedia contents, the users may participate in the multimedia contents to interact with the objects in the multimedia contents to have more fun. For example, the user may give an special effect gift to the objects in the multimedia contents.

Hence, it is currently an urgent issue to diversify the interactions between the user and the objects in the multimedia contents.

SUMMARY

To fully or at least partly address the above technical problem, the present disclosure provides method, apparatus, electronic device, readable storage medium and program product for interactions.

In a first aspect, the present disclosure provides a method for interactions, comprising:
  during a process of playing a multimedia content, in response to a trigger operation for a target virtual gift in a virtual gift display interface, displaying a control component for controlling a path of the target virtual gift, and a first object and a second object included in the target virtual gift;
  determining, in accordance with a state of the control component, a target path corresponding to the first object; and
  controlling the first object to move along the target path, wherein if the first object interacts with the second object during movement, a first effect corresponding to the second object is played.

In some embodiments, determining, in accordance with the state of the control component, the target path corresponding to the first object includes: determining the target path according to a path indicated by the control component.

In some embodiments, the method also comprises, before the determining the target path according to the path indicated by the control component: in response to a first trigger operation for the control component, updating the path indicated by the control component.

In some embodiments, the controlling the first object to move along the target path includes: in response to a second trigger operation on the control component, controlling the first object to move along the target path; or on the basis that the control component has not received a trigger operation for a preset time interval, controlling the first object to move along the target path.

In some embodiments, the method further comprises: if the first object, when moving along the target path, fails to hit the second object, playing a second effect at a preset position.

In some embodiments, playing the second effect at the preset position comprises:
  acquiring an offset angle between the target path and a reference path, wherein the reference path is determined according to a connecting line between the second object and a starting point of the target path; and
  acquiring the second effect corresponding to the offset angle in accordance with the offset angle and playing the second effect at the preset position.

In some embodiments, the method further comprises, before the controlling the first object to move along the target path:
  in response to an operation for triggering a style entry tag in the virtual gift display interface, displaying a style display interface including one or more styles corresponding to the target virtual gift; and
  in response to an operation for triggering a target style in the style display interface, switching a style of the target virtual gift into the target style.

In some embodiments, display parameters of the second object within a hittable range by the first object differ from that of the second object outside the hittable range by the first object.

In some embodiments, the display parameters include: one or more of brightness, size, hue, saturation and animation effect.

In a second aspect, the present disclosure provides an apparatus for interactions, comprising:
  a display module for playing a multimedia content;
  a receiving module for receiving an operation for triggering a target virtual gift in a virtual gift display interface;
  a processing module for generating, in response to an operation for triggering the target virtual gift in the virtual gift display interface, a control component and a first object and a second object included in the target virtual gift;
  wherein the display module is further provided for displaying the control component and the first object and the second object included in the target virtual gift, the control component being provided for controlling a path of the target virtual gift;
  the processing module is further provided for determining, in accordance with a state of the control component, a target path corresponding to the first object; and controlling the first object to move along the target path;
  the display module is further provided for displaying movement of the first object along the target path, wherein if the first object interacts with the second object during movement, playing a first effect corresponding to the second object.

In a third aspect, the present disclosure provides an electronic device, comprising: a memory, a processor and computer program instructions;

the memory is configured to store the computer program instructions;

the processor is configured to execute the computer program instructions to implement the interaction method according to the first aspect.

In a fourth aspect, the present disclosure provides a readable storage medium comprising: computer program instructions;

wherein the computer program instructions, when executed by at least one processor of the electronic device, implement the interaction method according to the first aspect.

In a fifth aspect, the present disclosure provides a program product, comprising: computer program instructions;

wherein the computer program instructions are stored in the readable storage medium, and the at least one processor of the electronic device read the computer program instructions from the readable storage medium;

the computer program instructions, when executed by the at least one processor, cause the electronic device to implement the interaction method according to the first aspect.

In a sixth aspect, the present disclosure provides a chip system comprising: a processor; when the processor execute the computer instructions stored in a memory, the electronic device executes the interaction method according to the first aspect and any of the first aspect.

BRIEF DESCRIPTION OF THE DRAWINGS

The drawings here are incorporated into the description as a part of it, illustrate the embodiments compliant with the present disclosure, and are combined with the description to explain the principles of the present disclosure.

To more clearly explain the embodiments of the present disclosure or technical solutions in related art, the drawings needed in the description of the embodiments or the related technology are to be introduced simply below. Apparently, those skilled in the art may further obtain other drawings from those illustrated without any exercises of inventive work.

DETAILED DESCRIPTION OF EMBODIMENTS

For a clearer understanding of the above objectives, features and advantages of the present disclosure, the solution of the present disclosure is to be further described below. It is to be appreciated that embodiments of the present disclosure and features within the embodiments may be combined with one another without causing conflicts.

Many details are elaborated in the following description to provide a more comprehensive understanding of the present disclosure. However, the present disclosure further may be implemented in different ways than those described here. Apparently, the embodiments disclosed in the description are only part of the embodiments of the present disclosure, rather than all of them.

As an example, the present disclosure proposes an interaction method, an apparatus, an electronic device, a readable storage medium and a program product. When a multimedia content is being played, a control component is displayed based on a trigger operation for a target virtual gift in a virtual gift display interface. The control component is operated to control a movement path of the target virtual gift. Accordingly, the movement path and the moving direction of the virtual gift are controlled by users in an individualized way while the needs of the users for interacting with the objects in the multimedia contents via the virtual gifts are also satisfied. Therefore, the users can participate in the multimedia contents in a more diversified way and be more inclined to watch the multimedia contents and accordingly interact in depth.

Besides, the target virtual gift includes a first object and a second object, where the first object starts to move along a target path. If the target object hits the second object while moving along the target path, a special effect corresponding to the second object is played at a position where the second object is hit. If the target object fails to hit the second object while moving along the target path, a further special effect is played. The users can deeply participate into the interactions through interesting ways and become more willingly to use the special effect again.

Wherein the multimedia contents may include video programs, video performances, live recorded contents, pre-recorded contents and the like. The present disclosure is not restricted in this regard.

As to the objects in the multimedia contents, for example, if the multimedia content is a dance performance, the object may include one or more dance performers; if the multimedia content is a crosstalk performance, the object may include one crosstalk performer or multiple crosstalk performers; if the multimedia content is a TV play or a movie, the object in the multimedia content may include one performer.

Wherein the interaction method according to the present disclosure is executed by the electronic device. The electronic device may be tablet computer, mobile phone (e.g., foldable phone, large screen mobile phone etc.), wearable device, on-board device, augmented reality (AR)/virtual reality (VR) device, notebook computer, ultra-mobile personal computer (UMPC), netbook, personal digital assistant (PDA), smart television, smart screen, high-definition television, 4K TV, smart speaker and smart projectors among other Internet of Things (IOT). The specific types of electronic devices are not restricted in the present disclosure.

Wherein the type of the operating system of the electronic device is not restricted in the present disclosure, such as Android system, Linux system, Windows system and iOS system etc.

In view of the previous description, the electronic device is used as an example in the embodiments of the present disclosure, and the method for interactions provided by the present disclosure is depicted in details with reference to the drawings and application scenarios.

An implementation process of the method for interactions according to the present disclosure is introduced with reference to FIGS. 1A-1L. To facilitate the description, the electronic device is a mobile phone installed with a short video social APP1 (application 1 for short), in which application 1 the live recorded singing performance is being played. The live recorded singing performance is the multimedia content.

Wherein FIGS. 1A-1L are schematic diagrams of the human-computer interaction interface provided by the embodiments of the present disclosure.

Figure 1A:
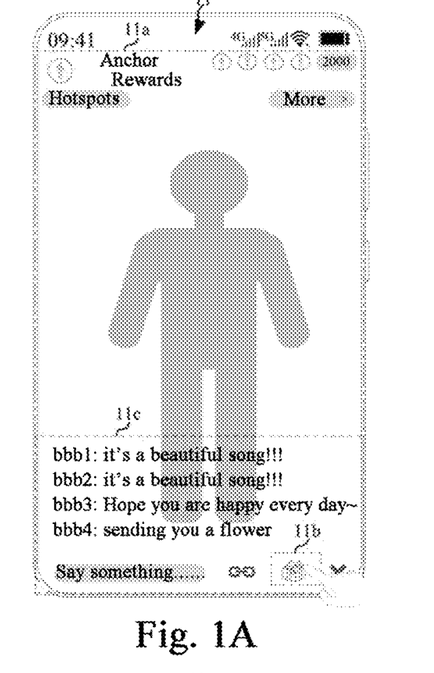
FIGS. 1A-1L are schematic diagrams of the human-computer interaction interface provided by some embodiments of the present disclosure.

Upon receiving a trigger operation for entering the multimedia content, the application 1 may schematically display on the mobile phones a user interface 11 illustrated in FIG. 1A, wherein the user interface 11 is used for displaying the multimedia content.

The user interface 11 includes: a play area 11a of the multimedia content and an entry tag 11b for entering the virtual gift display page. The present disclosure is not restricted in parameters of the play area 11a and the entry tag 11b, including area shape, area location, area size and whether the areas overlap etc. For example, the play area 11a may include the entire mobile phone screen and the entry tag 11b may be located inside the play area 11a and float above the play area 11a.

The play area 11a is used for displaying a playing screen of the multimedia content, so that the user can watch the multimedia content. In addition, the play area 11a may further be used for displaying a following button of the account associated with the currently playing multimedia content, the number of views of the currently playing multimedia content, the title of the currently playing multimedia content, and the like. In addition, the play area 11a may be used for displaying controls related to the currently playing multimedia content; e.g., a button for closing the currently playing multimedia content, a button for sharing the currently playing multimedia content, a button for projecting the currently playing multimedia content to a screen etc.

The above controls related to the currently playing multimedia content may be set in the top area of the play area 11a, or they may also be set in the bottom area of the play area 11a. In case there is a large number of controls, some of them may also be set in the top area of the play area 11a, while some are disposed in the bottom area of the play area 11a. The positions of these controls can be flexibly arranged according to the requirements, and the present disclosure is not restricted in display style and size of the controls among other parameters.

Continuing to refer to FIG. 1A, the user interface 11 may include: a comment area 11c for displaying comment information on the currently playing multimedia content. For example, FIG. 1A demonstrates that the comment area 11c includes comment information posted respectively by users bbb1 to bbb4. The comment area 11c may include an input box for posting the comment information. The present disclosure is not limited in the display parameters of the input box.

The present disclosure is not restricted in the way for displaying the comments in the comment area 11c. For example, a preset number of comment information can be displayed by scrolling in the comment area 11c according to the sequence of the posting time of the comment information; wherein, the latest comment information may be displayed at the bottom of the comment area 11c, and the earliest comment information may be displayed at the top of the comment area 11c; when there is new comment information, the comment information at the top of comment area 11c may disappear, and the latest comment information is displayed at the bottom of comment area 11c.

It is not restricted in the present disclosure whether the user interface 11 displays the comment area 11c. In some cases, the user interface 11 may further include a button that controls display or closing of the comment area. Based on an operation for triggering the button (such as click operation), the user interface is controlled to display the comment area or not. It should be noted that the button for controlling the display or closing of the comment area is not illustrated in the user interface 11.

In some cases, when the user interface 11 displays the comment area 11c, the comment area 11c may overlap with the play area 11a, and the comment area 11c may be configured to float above the play area 11a.

In addition, the positional relation between the entry tag 11b and the comment area 11c is not restricted in the present disclosure. For example, in the user interface 11 illustrated by FIG. 1A, the entry tag 11b is located inside the comment area 11c and displayed in a layer above the comment area 11c. In practical use, the entry tag 11b may not overlap with the comment area 11c. For example, the entry tag 11b may be disposed at the side of the play area 11a and try not to block the play screen of the multimedia content.

Figure 1B:
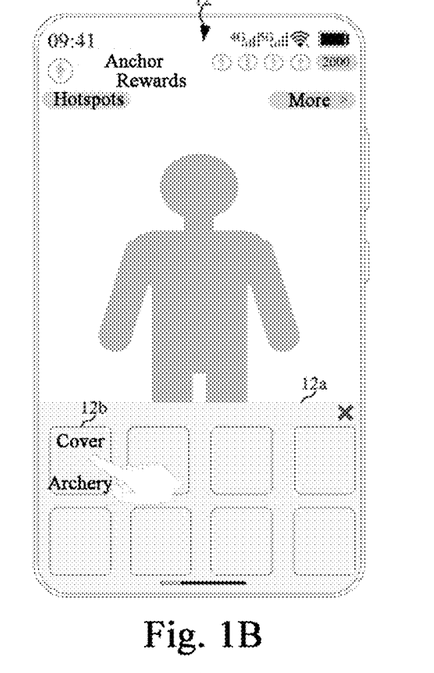

On the basis of the user interface shown in FIG. 1A, upon receiving an operation for triggering the entry tag 11b (e.g., click operation), the application 1 may schematically display on the mobile phone the user interface 12 as shown in FIG. 1B, where the user interface 12 includes: the virtual gift display interface 12a.

The virtual gift display interface 12a is used for displaying virtual gifts, so as to view the information about the virtual gifts provided by the application 1. The virtual gift display interface 12a may include an area 12b for displaying each virtual gift, where the area 12b may display related information of the virtual gift, such as one or more of the cover of the virtual gift, the name of the virtual gift, the value of the virtual gift and whether the virtual gift is the newly launched.

The present disclosure is not restricted in the display manner of the area 12b corresponding to each virtual gift in the virtual gift display interface 12a. Moreover, parameters of the area 12b corresponding to the virtual gift, such as area size and area shape, are not limited.

For example, the areas 12b corresponding to multiple virtual gifts may be displayed in order from left to right and from top to bottom, and the size of each area 12b is the same. For example, as shown in FIG. 1B, there are two rows in the virtual gift display interface 12a with each row displaying 4 virtual gifts. The users may view more virtual gifts by swiping left and right.

In addition, the area 12b may further display controls related to virtual gifts, such as gift giving control. In some embodiments, the default state of the controls related to the virtual gift is hidden display. Based on the trigger operation by the user (such as clicking any positions in the area 12b), one or more controls related to the virtual gift may be displayed. For example, in the user interface 12 shown in FIG. 1B, the controls related to the virtual gift may be displayed in the default state, i.e., hidden displayed. In some other embodiments, the default state of the controls related to the virtual gift is display state.

Figure 1C:
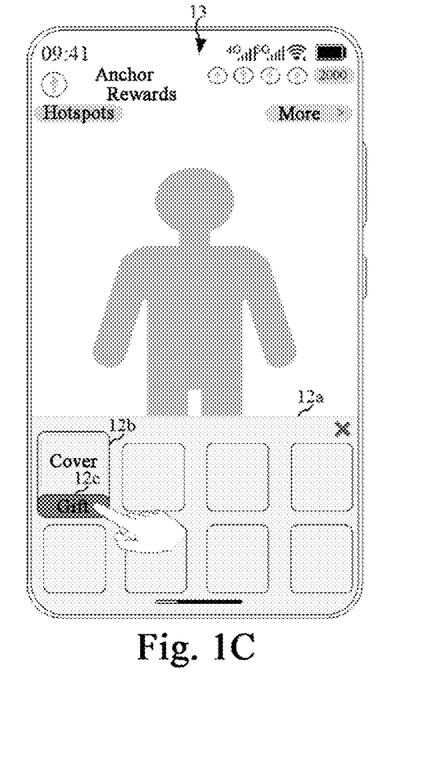

In response to an operation for triggering any position of the area 12b (e.g. click operation), the application 1 may schematically display the user interface 13 shown in FIG. 1C on the mobile phone. With reference to FIG. 1C, within the user interface 13, a gift giving control 12c for giving the virtual gift to the object in the multimedia content may be displayed in the area 12b.

The present disclosure is not restricted in the manner for displaying the target virtual gift selected by the user. For example, as shown in FIG. 1C, the target virtual gift selected by the user may be highlighted and the area 12b corresponding to the target virtual gift may be a bit larger than the size of the area of other unselected virtual gifts. Certainly, the target virtual gift selected by the user may not be highlighted, i.e., all virtual gifts are displayed in the same manner no matter they are selected or not selected.

If the user has not unlocked the permission for the target virtual gift, upon receiving an operation for triggering the gift giving control 12c, the application 1 may display on the mobile phone an interface for unlocking permission. The users may unlock the use permissions for the corresponding target virtual gifts by operating the relevant controls in the interface for unlocking permission. After the user has unlocked the permission for the target virtual gift, the application 1 may display on the mobile phone all the objects included in the triggered target virtual gift and the control component provided for controlling the movement path of the target virtual gift.

If the virtual gift permission is unlocked by purchasing, the interface for unlocking permission is the purchase interface; if the virtual gift permission is unlocked by completing an interactive task, the interface for unlocking permission is the interactive task interface. It should be noted that the embodiments of the present disclosure are not restricted in the implementations for unlocking the permissions for the target virtual gift by the user, and any approaches may be adopted for implementation. The details will not be elaborated here.

FIGS. 1D-1L schematically illustrate all the objects included in the triggered target virtual gift and implementations of the control component for controlling the movement path of the objects included in the target virtual gift.

It is assumed that the target virtual gift intended to be given to the objects in the multimedia content by the user is the virtual gift in the first row and the first column of the virtual gift display interface 12a shown by FIG. 1C, where the target virtual gift is "archery" and the user has unlocked the permission for the target virtual gift. Upon receiving an operation for triggering the gift giving control 12c in the area 12b corresponding to "archery" (e.g., click operation), the application 1 schematically displays on the mobile phone the user interface 14 illustrated by FIG. 1D.

Figure 1D:
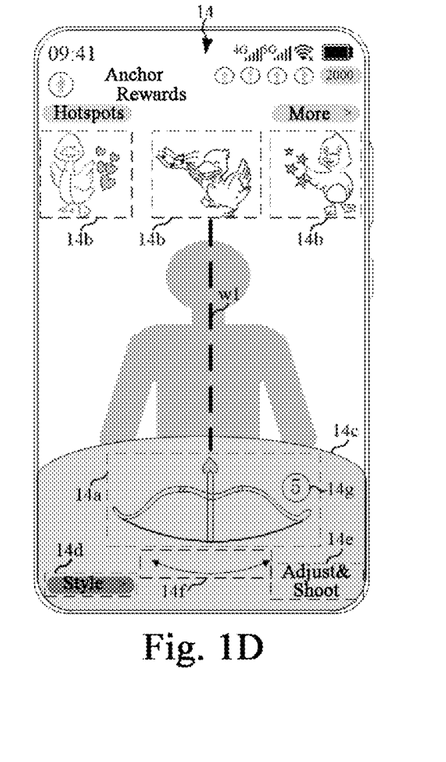

With reference to FIG. 1D, the user interface 14 includes: the first object 14a and the second object 14b included in the target virtual gift, and the control component 14c for controlling the movement path of the first object 14a of the virtual gift, wherein the first object 14a may be "bow and arrow" for the virtual gift of "archery", and the first object 14a moves along the path w1 indicated by the control component 14c; the second object 14b is the target to be shot by the first object 14a while the first subject 14a is moving along the path indicated by the control component 14c.

The first object 14a may be disposed in an area near the bottom of the mobile phone screen and the second object 14b may be arranged in an area near the top of the mobile phone screen. Such configuration is made to reduce the block over the play screen of the multimedia content by the control component and the objects included in the virtual gift when the user is giving the virtual gift to the objects in the multimedia content, so as to diminish the impact of the virtual gift giving on the user's viewing of the multimedia content.

For the first object 14a:

The present disclosure is not restricted in display parameters of the first object 14a, including the display brightness, the size, the color, the saturation, the animation effects etc.

For example, if the first object 14a is the bow and arrow, the "bow" may be in a golden color and the arrow body of the "arrow" may also be in the same color as the "bow", while the arrow head may be in a red heart shape. It is certain that the first object may also use other styles. For example, if the first object 14a is bow and arrow, the "arrow" may be partially or fully substituted by a predefined to create more fun. The predefined object, for example, may be "airplane". The present disclosure is not restricted in this regard.

Moreover, the application 1 may further support the setting about the style of the first object 14a. The present disclosure is not restricted in the implementations for setting the style of the first object 14a.

Figure 1E:
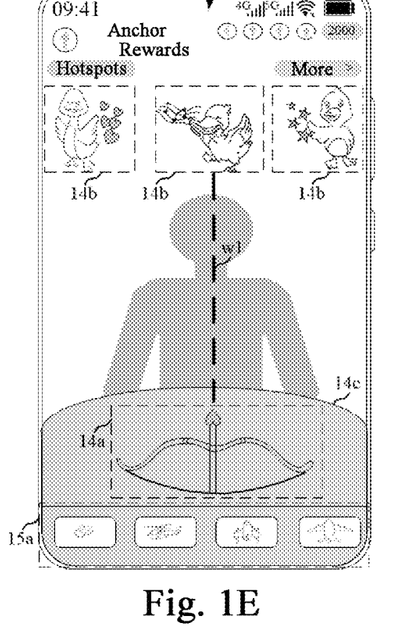
Figure 1F:
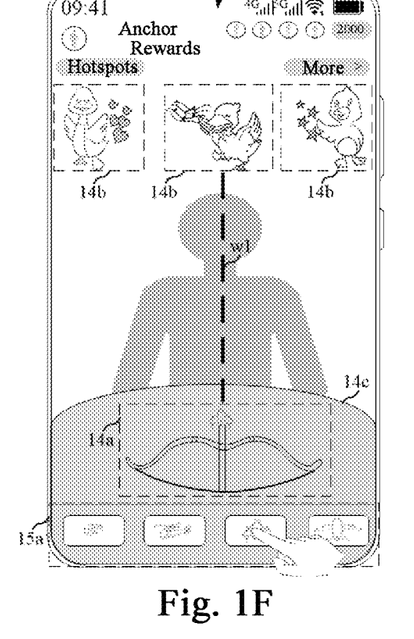
Figure 1G:
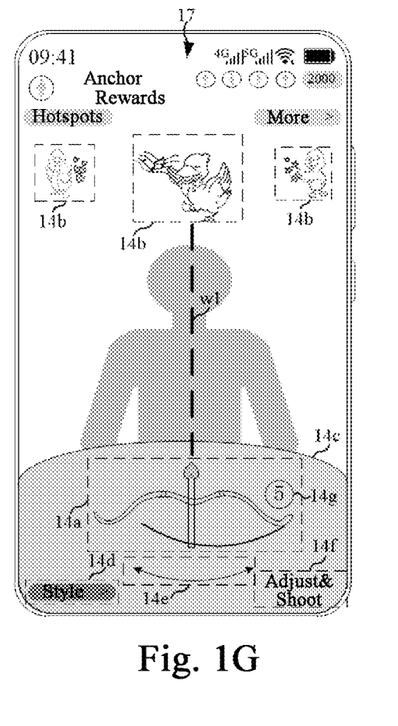

In one alternative implementation, the application 1 may include a style entry tag (such as the entry tag 14d shown in FIG. 1D) for entering the style display interface in the user interface that displays all objects included in the triggered target virtual gift and the control component, and may enter the style display interface 15a through the entry tag 14d. The style display interface 15a may display a variety of styles for the users to select a loved one.

For example, if the application 1 receives an operation for triggering the entry tag 14d in FIG. 1D (e.g., click operation), the application 1 may schematically display on the mobile phone the user interface 15 shown by FIG. 1E in response to the trigger operation, wherein the user interface 15 includes the style display interface 15a corresponding to the first object 14a. The style display interface 15a may display various styles and the user may make the configuration by clicking the area of the desired style.

The present disclosure is not restricted in the ways for displaying the various styles in the style display interface 15a. For example, respective objects included in the target virtual gift may be classified, a corresponding style entry tag may be set for each object, and the style corresponding to an object may be displayed based on the style entry tag for the object; or, each style may include styles respectively corresponding to all objects included in the entire target virtual gift and the user may directly select one therefrom.

Continuing to refer to the style display interface schematically illustrated by FIG. 1E, the style display interface 15a displays 4 styles, wherein styles 1 to 4 are all relate to the arrow head of the bow and arrow. Upon receiving an operation for triggering the style 3 (e.g., click operation), the application schematically displays on the mobile phone the user interface shown by FIG. 1F. In the user interface 16 shown by FIG. 1F, the arrow head of the bow and arrow included in the first object 14b is in the selected style 3, i.e., airplane shape.

Besides, in a process of configuring styles for the target virtual gift, the application 1 supports the preview of effects. With reference to the above embodiments shown by FIGS. 1E to 1F, assuming that the user selects the style 3 and later dislikes it during the preview, he/she may re-select other styles and preview the effects. Alternatively, the user may exit the style configuration for the target virtual gift, i.e., exit the style display interface 15a. The following operations may be performed subject to the original style.

The implementation for exiting the style display interface 15a is not restricted in the present disclosure. For example, the style display interface 15a may include a closing button. By operating the closing button, the user may exit the style display interface 15a. For another example, the user may exit the style display interface 15a by clicking any position outside the style display interface 15a.

For the second object 14b:

The second object 14b is a target object to be shot by the first object 14a. The present disclosure is not restricted to the parameters of the second object 14b, including whether the second object 14b has animation effects; the quantity, the movement state and the display parameters of the second object 14b; and the special effect animation corresponding to the second object 14b.

Wherein the second object 14b may be in a dynamic style or in a static style. For example, if the second object 14b is in the dynamic style, the heart in the second object at the far left side, the musical symbol in the second object at the middle position, and the star in the second object at the far right side may flicker continuously in the user interface 14 demonstrated by FIG. 1D. It is certain that when the second object 14b is in the dynamic style, any dynamic effects may be used and the present disclosure is not restricted to the situation described here.

It is to be noted here that "static style" here means that the object does not have dynamic effects; and "dynamic style" indicates that the object has dynamic effects.

In addition, in accordance with whether the second object 14b is within a shooting range of the first object 14a, it is determined whether to display the second object 14b in dynamic or static style. For example, if the second object 14b is within the shooting range of the first object 14a, the second object 14b is in the dynamic style; while if the second object 14b is outside the shooting range of the first object 14a, the second object 14b may be in the static style.

With reference to the embodiment shown by FIG. 1D, the second object 14b at the middle position, if within the shooting range in the user interface 14, is displayed in the dynamic style, e.g., the music symbol constantly flickers. Correspondingly, the second objects 14b at the far left side and the right most side are in static style, i.e., the heart and the star do not flicker.

Wherein there may be multiple second objects 14b or only one second object 14b. The present disclosure is not restricted in the quantity of the second object 14b. For example, FIG. 1D illustrates a scenario including three second objects 14b. In practical case, the quantity of the second object 14b may be configured more or less, e.g., there may be 2 or 4 second objects 14b etc.

In addition, the position of the second object 14b may constantly change, or be static.

For example, the position of the second object 14b may move from left to right, and the first object is required to shoot a target object in a moving state. The shooting accordingly becomes more difficult and the need for a rather difficult shooting by the user is satisfied. It is certain that the movement of the position of the second object 14b may not be restricted to from left to right, and the second object 14b may move front right to left. The way how the second object 14b moves is not restricted in the present disclosure. Furthermore, the difficulty of shooting may be controlled by manipulating the moving speed of the second object 14b. The shooting becomes more difficult as the moving speed of the second object 14b increases; and the shooting becomes easier if the moving speed of the second object 14b slows down. The user may feel a sense of achievement if he/she can hit the target object in a relatively difficult shooting. The user then may use the gift special effect more actively. For another example, if the position of the second object 14b is static, the difficulty for shooting may decrease. Different users may have various needs for the difficulty in shooting the virtual gift. To satisfy these needs, the position of the second object 14b may be configured in moving or static state.

Additionally, if the first object 14a moves along the path indicated by the control component 14c, the second object 14b that can be hit by the first object 14a has different display parameters than the second object 14b that is not hit by the first object 14a.

Where the first object 14a moves along the path indicated by the control component 14c and the second object 14b can be hit by the first object 14a, it indicates that the second object 14b is within the shooting range of the first object 14a. In such case, the display parameters of the second object 14b are configured to prompt the user that the target object can be hit if the second object 14b moves along the current path. Where the first object 14a moves along the path indicated by the control component 14c and the second object 14b could not be hit by the first object 14a, it indicates that the second object 14b is outside the shooting range of the first object 14a. Accordingly, the display parameters of the second object 14b are configured to prompt the user that the path of the first object 14a may be adjusted by manipulating the control component 14c.

Wherein the display parameters may include brightness. For example, as shown in FIG. 1D, the second object 14b at the middle position is within the shooting range of the first object 14a, so the brightness of the second object 14b at the middle position may be set to a first brightness value; the two second objects 14b at left and right sides are outside the shooting range of the first object 14a, so their brightness is set to a second brightness value, where the first brightness value is greater than the second brightness value.

The display parameters may further include a size. For example, with reference to FIG. 1G, the second object 14b at the middle position is within the shooting range of the first object 14a and is accordingly configured to have a first size; the two second objects 14b at left and right sides are outside the shooting range of the first object 14a and thus are configured to have a second size, where the first size is greater than the second size. For example, the first size may be 3 cm*3 cm and the second size is 2 cm*2 cm. The size may also be denoted in pixels.

In some other embodiments, the brightness may be combined with the size. For example, the second object within the shooting range of the first object has a higher brightness and a larger size, while the second object outside the shooting range of the first object has a lower brightness and a smaller size.

The display parameters certainly are not restricted to the brightness and the size, and may also be other parameters like hue and saturation etc. The parameter is feasible as long as it can enable the user to distinguish the second object within the shooting range of the first object from the one outside the shooting range of the first object.

If the user adjusts the path of the first object 14a by manipulating the control component 14c, the shooting range of the first object 14a is also adjusted. Still by the same principle, different display parameters are configured for the second object 14b within the shooting range and the second object 14b outside the shooting range.

In addition, each second object 14b corresponds to one effect animation. If the first object 14a moves along the path indicated by the control component and hits the second object 14b, an effect animation corresponding to the second object 14b is played at the position where the second object 14b is hit. If the virtual gift includes a plurality of second objects 14b, the effect animation corresponding to each second object 14b may not be completely the same.

As an example, in the user interface 14 shown by FIG. 1D, the effect animation corresponding to the second object 14b at the far left side is heart effect; the effect animation corresponding to the second object 14b at the middle position is music symbol effect; the effect animation corresponding to the second object 14b at the far right side is star effect. If the first object 14a moves along the current path w1 and hits the second object 14b at the middle position, the music symbol effect is played at a position where the second object 14b at the middle position is hit after the first object 14a hits the second object 14b at the middle position; if the first object 14a can hit the second object 14b at the far right side after its path is adjusted, the star effect is played at a position where the second object 14b at the far right side is hit.

In the present disclosure, the target virtual gift provides a plurality of second objects 14b, and each second object 14b corresponds to different effect animations. Therefore, the user can choose as he/she needs or likes, to shoot the second object 14b corresponding to the effect animation intended to be played. The user's need is accordingly satisfied and the user experience is also enhanced.

Next, the control component 14c is to be introduced:

The control component 14c mainly controls the path of the first object 14a. Upon receiving an operation for triggering the control component 14c (e.g., sliding operation), the application may adjust the direction of the indicated path w1 by analyzing the rotation angle of the trigger operation. At the meantime, the application 1 may adjust the orientation of the first object 14a.

Continuing with the above description, if the target virtual gift is "archery" as an example, after the user triggers the target virtual gift, the default direction of the path w1 displayed on the mobile phone by the application 1 is right forward, i.e., the dotted line w1 shown in FIG. 1D. Subsequent to receiving a first trigger operation for the control component 14c (e.g., swipe left operation), the application 1 schematically displays on the mobile phone the user interface illustrated in FIG. 1H. Compared to the path w1 illustrated in FIG. 1D, the path w2 in the user interface shown by FIG. 1H changes in direction, i.e., the path direction is offset to the right by an offset angle of a.

Figure 1H:
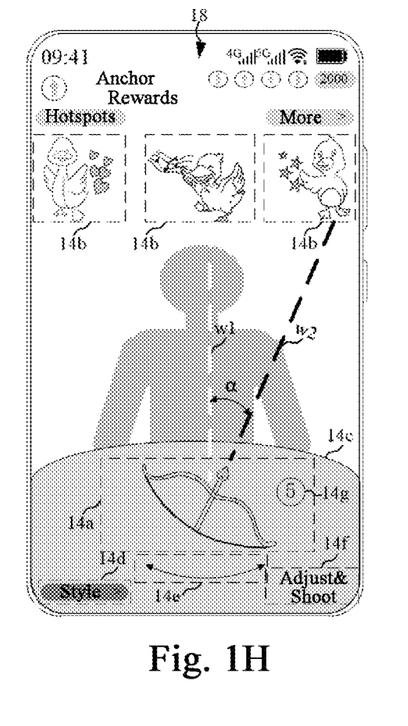
Figure 1I:
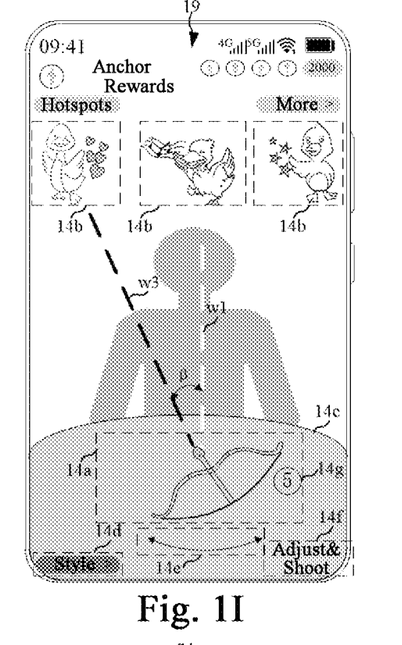

For another example, on the basis of the embodiment shown by FIG. 1D, upon receiving the first trigger operation for the control component 14c (e.g., swipe right operation), the application 1 schematically displays on the mobile phone the user interface illustrated in FIG. 1I. Compared to the path w1 illustrated in FIG. 1D, the path w3 in the user interface shown by FIG. 1I changes in direction, i.e., the path direction is offset to the left by an offset angle of β.

It is to be explained here that in the embodiments shown by FIGS. 1H and 1I, the path w1 is indicated by white dotted line to distinguish the path w1 from the path w2 and the path w1 from the path w3. In practical applications, when the path is adjusted by control component 14c, the original path, i.e., the path 1, may not be displayed.

With reference to the situations demonstrated in FIGS. 1H and 1I, when the first trigger operation is the swipe left operation, the direction of the path is offset to the right; when the first trigger operation is the swipe right operation, the direction of the path is offset to the left. That is, the direction of the swipe operation is opposite to the direction of the path. Such configuration is more fitted to the user habits. In addition, as the swiping trajectory generated by the swipe operation lengthens, the rotation angle indicated by the swiping trajectory becomes bigger and the offset angle of the path direction increases; by contrast, if the swiping trajectory generated by the swipe operation shortens, the rotation angle indicated by the swiping trajectory becomes smaller and the offset angle of the path direction decreases.

Besides, with reference to the situations shown by FIGS. 1H and 1I, in response to the first trigger operation for adjusting the path, the application 1 adjusts the orientation of the first object 14a simultaneously. According to the embodiment in FIG. 1H, if the path is offset to the right by α, the orientation of the bow and arrow also deviates to right by α; as shown in the embodiment of FIG. 1I, if the path is offset to the left by β, the orientation of the bow and arrow also shifts to the left by β. Therefore, the user may gain a more realistic feel in the archery scenes.

In addition, the control component 14c may control the first object 14a to start moving along the indicated path, i.e., control the emission of the first object 14a. Upon receiving a second trigger operation for the control component 14c (i.e., drag and drop operation), the application 1 controls part or all of the first object 14a to start moving along the path indicated by the control component 14c.

Figure 1J:
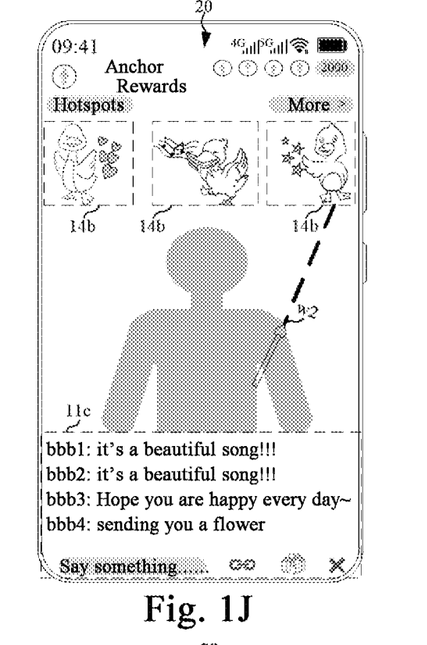

With reference to the previous description, it is assumed that the target virtual gift is "archery" as an example and the first object 14a starts to move along the path w2 indicated by FIG. 1I; the application 1 receives the second trigger operation for the control component 14c (i.e., drag and drop operation); in response to the drag and drop operation for the control component 14c, the application 1 may schematically display on the mobile phone the user interface 20 illustrated in FIG. 1J. In the user interface 20 shown by FIG. 1J, the "arrow" part included in the bow and arrow moves forward along the path w2 indicated by FIG. 1H, and the "bow" part included in the bow and arrow may disappear after the "arrow" is shot. In other words, during the shooting of the first object 14a, part of the first object 14a moves along the path for shooting the target, while the other part disappears. On one hand, this may prevent the image at the emission starting point of the first object 14a from blocking the play screen of the multimedia content and ensure the comfort of the user for watching the multimedia content while the target virtual gift is being played. On the other hand, the image at the emission starting point of the first object 14a will not disappear. Instead, the comment area 11c and the controls related to the multimedia content may also be displayed at the corresponding position, allowing the user to timely obtain the comment information related to the multimedia content.

It is certain that if a part of the first object 14a is shot in practical scenarios, the other part may not disappear either and is just displayed at the position of the emission starting point of the first object 14a. The present disclosure is not restricted in this regard.

It is to be explained that the first object 14a may move at a preset speed along the path indicated by the control component. The preset speed is not limited in the present disclosure. For example, the preset speed may be constant or it may be fast in the first place and then slows down.

In the user interface 20 indicated by FIG. 1J, the "arrow" included in the first object 14a moves forward by a distance from the start point, but fails to hit the second object 14b. If the "arrow" included in the first object 14a continues to move forward along the path, it may hit the second object 14b at the far right side in the user interface 20.

Wherein the application 1 may determine whether the first object 14a hits the second object 14b by analyzing whether the area of the first object 14a that moves along the path indicated by the control component 14c overlaps with the area of the second object 14b; if it is determined that the first object 14a hits the second object 14b, the effect animation corresponding to the hit second object is played at the position where the second object 14a is hit. According to the situation illustrated by FIG. 1J, the application 1 determines that the "arrow" hits the second object 14b at the far right side by analyzing that the area of the "arrow" included in the first object 14a overlaps with the area of the second object 14b at the far right side. Accordingly, the star effect is played at the position where the second object 14b at the far right side is hit.

Moreover, the control component 14c may display first guidance information. The first guidance information may be implemented by image-guided text descriptions and is provided mainly for guiding the user to correctly operate the control component. The present disclosure is not restricted in the implementations of the first guidance information.

For example, with reference to the user interface 14 shown by FIG. 1D, the first guidance information includes: a guiding image 14e and a text prompt area 14f, where the guiding image 14e is an arc with arrows at both ends to indicate that the user may slide towards any direction pointed by the arrow head; and the text prompt area 14f may display a text content therein, like "emit by swiping left and right and dragging". Accordingly, the user can obtain text descriptive information for operating the control component.

The position of the first guidance information may be set as required and the position shown in FIG. 1D is just an example. The first guidance information may be disposed at a position where the first object 14a is not affected, to reduce the block over the first object 14a by the first guidance information in case of orientation changes of the first object 14a during adjustment.

Besides, when the user is adjusting the path by swiping left and right and controlling the emission of the first object, the first guidance information may disappear, or it may be displayed in the user interface. The present disclosure is not restricted in this regard.

Additionally, with reference to the user interface 14 shown by FIG. 1D, the control component 14c may include: a timer 14g for timekeeping. A timing result is used for controlling the first object to start moving along the path indicated by the control component 14c. The timer may keep time in unit of "seconds".

The present disclosure is not restricted in parameters of the timer 14g, including display style, display position and size etc. As an example, the timer 14g may adopt a circular style, a square style, an elliptical style with relatively simple lines, or a complex style, etc., wherein FIG. 1D schematically shows a relatively simple circular style adopted by the timer 14g. For example, the timer 14g may be displayed below the first object 14a included in the target virtual gift, or the timer 14g may be displayed at the left or right side of the first object 14a included in the target virtual gift.

For example, if the value of the timer 14g is equal to a preset value (such as 5 seconds), the first object 14a is controlled to start moving along the path indicated by the control component 14c.

Wherein the timer 14g may start timing from the moment when the application 1 displays the control component 14c and all objects included in the triggered target virtual gift. The timing method may be in a countdown or sequential form.

In addition, if the application 1 receives an operation for triggering the control component 14c (such as swiping left operation or swiping right operation) while the timer 14g is counting, the timer 14g is set to an initial value (e.g., 5) restarts the countdown when the control component 14c finishes adjusting the path; if failing to receive the operation for triggering the control component 14c (i.e., drag and drop operation) during the process where the countdown is restarted, the application 1 would control the first object to move along the path indicated by the control component 14c at the end of the countdown restarted by the timer 14g. However, if the application 1 receives the operation for triggering the control component 14c (i.e., drag and drop operation) when the countdown is restarted and not finished yet, the first object is controlled to move along the path indicated by the control component 14c.

Figure 1K:
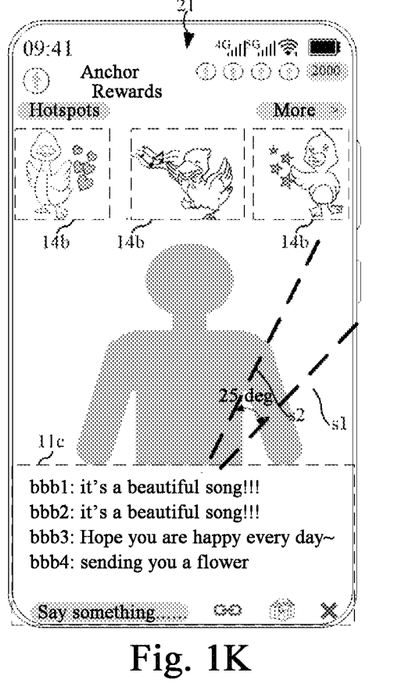

In some cases, the first object 14a could not hit any target objects (i.e., the second object) even if it moves along the path finally indicated by the control component 14c. For example, FIG. 1K schematically illustrates the scenario where the first object 14a moves along the path finally indicated by the control component 14c. With reference to the user interface 21 illustrated by FIG. 1K, the path finally indicated by the control component 14c is indicated by line s1 (hereinafter referred to as "path s1"), where the path s1 is offset to the right by a greater angle and none of the above three second objects 14b is within the shooting range of the first object 14a. In other words, the first object 14a could not hit any one of the second objects 14b if it moves along the path s1 indicated by FIG. 1K. In such case, a further preset animation effect is played.

In an alternative implementation, if the first object 14a fails to hit any second object 14b, the preset effect animation to be played has nothing to do with the offset degree of the second object 14b having the smallest offset, i.e., despite the angle of the offset, the preset effect animation is played as long as the first object 14a fails to hit any second object 14b.

For example, a effect animation A may be preset and is accordingly played as long as the first object 14a fails to hit the second object 14b. For another example, a plurality of effect animations may be preset, e.g., effect animations A, B and C may be played in a predetermined order (such as a sequence from A to C). When the target virtual gift given for the first time by the user fails to hit the second object 14b, the effect animation A is played; if the target virtual gift given for the second time by the user fails to hit the second object 14b, the effect animation B is played; if the target virtual gift given for the third time by the user fails to hit the second object 14b, the effect animation C is played. Alternatively, one of the plurality of effect animations may be randomly selected for play.

In another alternative implementation, if the first object 14a fails to hit any second object 14b, the offset degree of the second object 14b with the smallest offset during the shooting of the first object 14a is analyzed, so as to play different effect animations in accordance with the offset degree.

For example, three corresponding relations are preset: if the angle of the second object with the smallest offset is within 30 degrees, the effect animation A is played; if the angle of the second object with the smallest offset is between 30 and 60 degrees, the effect animation B is played; if the angle of the second object with the smallest offset is between 60 and 90 degrees, the effect animation C is played.

In practical applications, more or fewer corresponding relations may be preset between the offset degree and the effect animation. The present disclosure is not restricted in the three corresponding relations depicted in the above examples.

Furthermore, by analyzing an offset degree between the path along which the first object 14a fails to hit the second object 14b and the nearest second object 14b, the application 1 plays different effect animations. For example, with reference to the user interface 21 shown by FIG. 1K, the path s1 is the movement path of the first object 14a and the first object 14*a* fails to hit any second object 14*b* along the path s1; the second object 14*b* with the smallest offset during the shooting of the first object 14*a* is the second object 14 at the far right side in the user interface; if the first object 14*a* is to hit the second object at the far right side, the first object 14*a* needs to move along the path s2 displayed in the user interface 21. The offset degree is determined by analyzing an angle between the paths s1 and s2. According to FIG. 1K, assuming that the angle between the paths s1 and s2 is 25 degrees, it is determined that the effect animation A is played by looking up in the above corresponding relations.

With reference to the above example, on the assumption that the angle between the paths s1 and s2 is 25 degrees and the effect animation A is a "sad" face effect animation, the application 1 may play the "sad" face effect animation at the preset position.

On the basis of the embodiment shown by FIG. 1K, when the first object 14*a* fails hit the second object 14*b*, the corresponding effect animation may be played at the preset position. The present disclosure is not restricted in the preset position. For example, the preset position may be the final position of the path indicated by the control component, the position near the top of the screen, or the position near the lateral side of the screen etc. When the effect animation is played at the preset position, it should try to avoid blocking the play screen of the multimedia content.

Figure 1L:
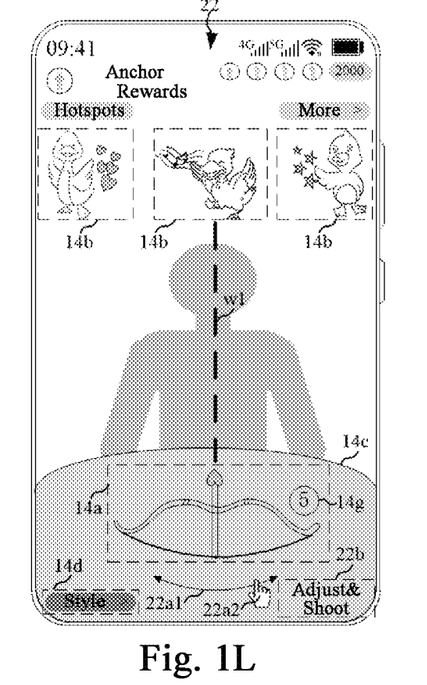

In view of the above description, if the target virtual gift is used by the user for the first time, after the user triggers the target virtual gift, the application 1 may schematically display on the mobile phone the user interface 22 illustrated by FIG. 1L. According to FIG. 1L, the user interface 22 may include second guidance information in addition to all objects included in the triggered target gift and the control component, wherein the second guidance information may be implemented by combining images with text information. As an example, the second guidance information includes a guiding image 22*a* and a text prompt area 22*b* in the user interface 22.

With reference to FIG. 1L, the user interface 22 includes: the guiding image 22*a* and the text prompt area 22*b*, wherein the text prompt area 22*b* may display a prompt text therein, like "emit by swiping left and right and dragging" as shown in FIG. 1L, similar to the first guidance information. The guiding image 22*a* may have animation effects and may include: a gestures 22*a*1 and a trajectory image 22*a*2. The trajectory image 22*a*2 may be an arc with arrows at both ends and the gesture 22*a*1 may move left and right along the arc. The user may perform the correct operation in accordance with the text displayed in the text prompt area 22*b* and the animation effect of the guiding image 22*a*. After the user performs the correct operation once, the second guidance information may disappear. The user then officially operates the target virtual gift.

Before the user performs one correct operation based on the second guidance information, the animation effect of the guided gesture may be displayed repeatedly.

The present disclosure is not restricted in the parameters of the second guidance information, including display manner, display position and display style etc. For example, the text prompt area 22*b* may be located below the guiding image 22*a*, where the guiding image 22*a* may be located below the first image 14*a*; or the text prompt area 22*b* included in the second guidance information may be located at the left side or the right side of the guiding image 22*a*, where the guiding image 22*a* may be located below the first image 14*a*.

It is to be explained that when the audience giving the gift controls the first object 14*a* to start moving along the path finally indicated by the control component 14*c*, the server end may simultaneously update the user interface of all the clients associated with the multimedia content. Among the user interface illustrated in FIGS. 1A to 1L, the user interface shown by FIGS. 1J and 1K may be the user interface for the audience giving the gift, or the user interface for the live streaming end or the audience not giving the gift. Apart from those shown in FIGS. 1J and 1K, other user interface is provided for the audience giving the gift.

It is to be noted that the user interface illustrated in FIGS. 1A to 1L is provided only as examples to explain the method for interactions provided by the present disclosure, rather than limit it.

Figure 2:
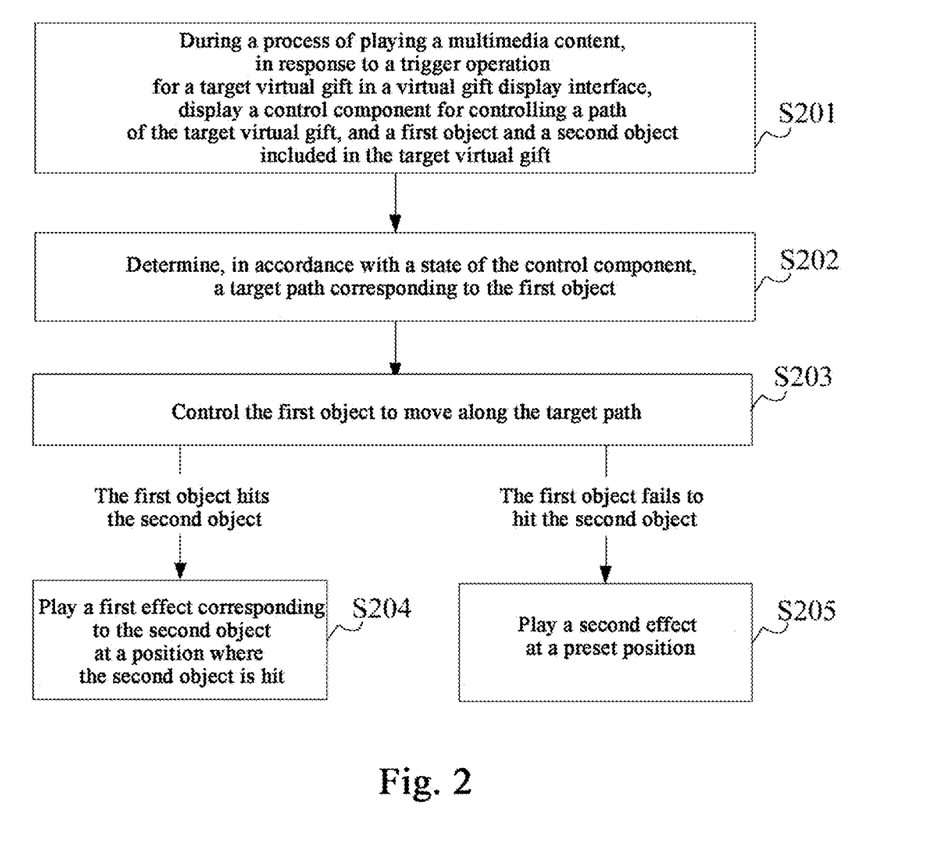
FIG. 2 is a flow diagram of an interaction method provided by some embodiments of the present disclosure.

On the basis of the description of FIGS. 1A to 1L, the specific implementation of the method for interactions provided by the present disclosure is introduced in details with reference to FIG. 2. FIG. 2 is a flow diagram of the method for interactions provided by the present disclosure. With reference to FIG. 2, the method provided by the embodiments comprises:

S201: during a process of playing a multimedia content, in response to a trigger operation for a target virtual gift in a virtual gift display interface, display a control component for controlling a path of the target virtual gift, and a first object and a second object included in the target virtual gift.

The electronic device is mounted with application programs, and may play the multimedia contents in the application programs after they are initiated. The present disclosure is not restricted in the specific types of the application programs and the specific types and the contents of the multimedia contents.

While playing the multimedia contents in the application programs, the electronic device may receive an operation for triggering the target virtual gift in the virtual gift display interface input by the user (e.g., click operation). In response to this trigger operation, the application programs display on the electronic device the first object and the second object included in the triggered target virtual gift, and the control component that controls the movement path of the first object. For example, the first object 14*a* and the second object 14*b* included in the target virtual gift and the control component 14*c* are displayed in the user interface illustrated by FIGS. 1A-1L.

The first object 14*a*, the second object 14*b* and the control component 14*c* have been introduced in details with reference the above embodiments and will not be repeated here. The present disclosure is not restricted in the display parameters of the first object, the second object and the control component, including display size, style, quantity, position and animation effect etc.

S202: determine, in accordance with a state of the control component, a target path corresponding to the first object.

Based on the operation triggered for the target virtual gift, the displayed control component corresponds to the default state, which may indicate a default path. For example, the path w1 illustrated by FIG. 1D is directed right forward. On this basis, the user may input to the electronic device the first trigger operation for the control component (e.g., swiping left or swiping right operation as described in the above embodiments). In response to the first trigger operation, the application program adjusts the state of the control component, i.e., adjust the path indicated by the control component. The path indicated by the control component after the adjustment is the target path. For example, the path w2 shown in FIG. 1H and the path w3 illustrated in FIG. 1I are both target paths; alternatively, the user may not operate the control component; in such case the default path indicated by the control component is the target path. For instance, the path w1 indicated by FIG. 1D is the target path.

It is to be explained that when the user adjusts the path through the control component, a plurality of continuous first trigger operations may be performed. The quantity of the first trigger operation is not restricted in the present disclosure.

Besides, the display parameters of the second object within the shooting range of the first object are different from those of the second object outside the shooting range of the first object, wherein the display parameters may include: one or more of brightness, size, hue, saturation and animation effect. The implementations may refer to the description related to the second object in the previous embodiments and will not be repeated here for conciseness.

S203: control the first object to move along the target path.

In an alternative implementation, the first object may be controlled by the second trigger operation for the control component (e.g., drag and drop operation) to move along the target path. The specific implementation may refer to the previous description and will not be repeated here.

In another alternative implementation, in the absence of the second trigger operation for the control component, the first object may be triggered based on time to move along the target path. The specific implementation may refer to the description of the timer in the above embodiment shown by FIG. 1D and will not be repeated here.

If the first object moves along the target path and hits the second object, the step S204 is performed; if the first object moves along the target path and fails to hit the second object, the step S205 is performed.

S204: pay a first effect corresponding to the second object at a position where the second object is hit.

S205: play a second effect at a preset position.

Wherein the first effect is different from the second effect. To be specific, the first effect is the effect animation played when the first object successfully hits the second object, while the second effect is the effect animation played when the first object fails to hit the second object.

If the first object hits the second object, the first effect corresponding to the second object may be played at the position where the second object is hit. The specific implementation may refer to the description of the embodiment shown by FIG. 1J and will not be repeated here.

If the first object fails to hit the second object, the second effect may be played at the preset position. The present disclosure is not restricted to the preset position and the preset position may be any position in the user interface.

In some embodiments, the second effect may be a preset effect animation, and may be one effect animation determined from a plurality of preset effect animations according to the preset sequence or one effect animation randomly selected from a plurality of preset effect animations.

In some other embodiments, the second effect may be determined in accordance with the offset degree of the second object having the smallest offset to the target path. The specific implementation may refer to the description of the embodiment shown by FIG. 1K and will not be repeated here.

It is to be explained that when the control component indicates the path of the first object and the first object moves along the path, the second object within the shooting range of the first object has different display parameters than the second object outside the shooting range of the first object. The display parameters are not restricted in the present disclosure. For example, the second object within the shooting range of the first object may have a brightness higher than the second object outside the shooting range of the first object; or the second object within the shooting range of the first object may have a size larger than the second object outside the shooting range of the first object; or the second object within the shooting range of the first object may be distinguished from the second object outside the shooting range of the first object with reference to both the brightness and the size.

By configuring different display parameters for the second object within the shooting range of the first object and the second object outside the shooting range of the first object, the present disclosure may prompt the user operating the target virtual gift about which second object may be hit if the first object follows the current path. As such, the probability of a successful shooting is increased and the user may more actively use the virtual gift.

Besides, it is also noted that steps S203 to S205 are provided not only for the user that operates the target virtual gift, but also for the user associated with the multimedia contents, wherein the user associated with the multimedia contents may include: other users that watch the multimedia contents and the users that provide the multimedia contents. Assuming that the multimedia content is the live recorded singing performance, the user that provides the multimedia content is the user that recodes the singing performance.

In the method provided by the embodiments, when the multimedia contents are being played, based on an operation for triggering the target virtual gift included in the virtual gift display interface, and the control component is operated to control a movement path of the target virtual gift. Accordingly, the movement path and the moving direction of the virtual gift are controlled by users in an individualized way while the needs of the users for interacting with the objects in the multimedia contents via the virtual gifts are also satisfied. Therefore, the users can participate in the multimedia contents in a more diversified way and be more inclined to watch the multimedia contents and accordingly interact in depth. Besides, the target virtual gift includes a first object and a second object, where the first object starts to move along a target path. If the target object hits the second object while moving along the target path, a effect corresponding to the second object is played at a position where the second object is hit. If the target object fails to hit the second object while moving along the target path, a further effect is played. The users can deeply participate into the interactions through interesting ways and become more willingly to use the effect again.

Figure 3:
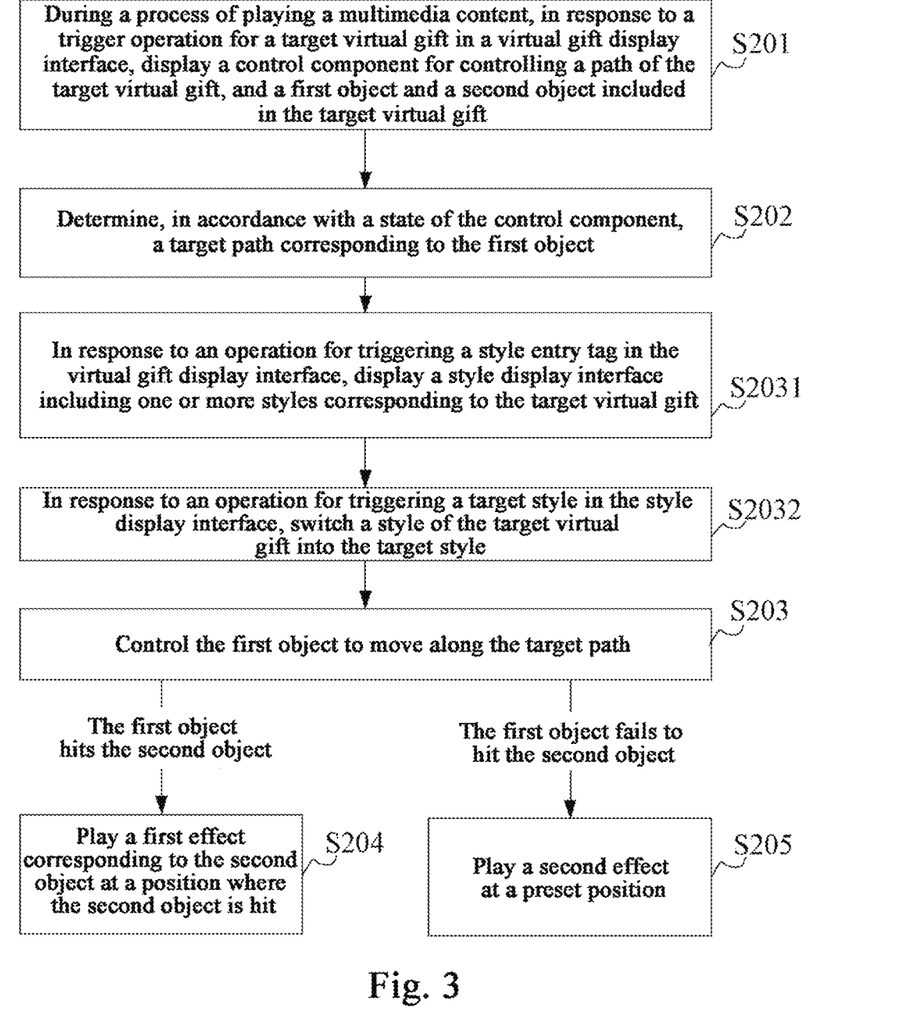
FIG. 3 is a flow diagram of an interaction method provided by some embodiments of the present disclosure.

FIG. 3 is a flowchart of the method for interactions provided by a further embodiment of the present disclosure. With reference to FIG. 3, on the basis of the embodiment shown by FIG. 2, the method for interactions provided by the embodiment comprises, before the controlling the first object to move along the target path:

S2031: in response to an operation for triggering a style entry tag in the virtual gift display interface, display a style display interface including one or more styles corresponding to the target virtual gift.

S2032: in response to an operation for triggering a target style in the style display interface, switch a style of the target virtual gift into the target style.

In this solution, the application programs may support the user-customized style of the target virtual gift.

In some embodiments, the application may enter the style display interface via the style entry tag in the virtual gift display interface. The style display interface may display a variety of styles according to the preset manner and the style of the target virtual gift may be switched to the style liked by the user according to the user's choice.

The style entry tag may be the entry tag 14d illustrated in the embodiment of FIG. 1D. In response to the user's operation for triggering the entry tag 14d (e.g., click operation), the application enters the style display interface and selects the target style. The specific implementation of the above feature may refer to the detailed description of the embodiments shown by FIGS. 1D, 1E and 1F and will not be repeated here for conciseness.

The method provided by the embodiments may fulfill the user-customized style of the target virtual gift, to satisfy the individualized requirements of the user. Accordingly, the user may use the virtual gift more actively.

As an example, the present disclosure also provides an apparatus for interactions.

Figure 4:
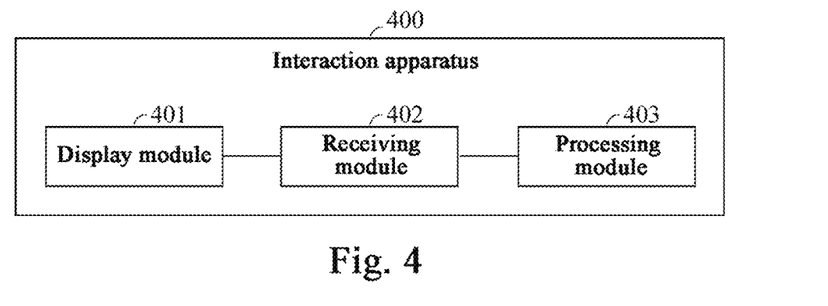
FIG. 4 is a structural diagram of an interaction apparatus provided by some embodiments of the present disclosure.

FIG. 4 is a structural diagram of the apparatus for interactions provided by some embodiments of the present disclosure. With reference to FIG. 4, the apparatus for interactions 400 according to the embodiments comprises:

a display module 401 for playing a multimedia content;
a receiving module 402 for receiving an operation for triggering a target virtual gift in a virtual gift display interface;
a processing module 403 for generating, in response to an operation for triggering the target virtual gift in the virtual gift display interface, a control component and a first object and a second object included in the target virtual gift;
wherein the display module is further provided for displaying the control component and the first object and the second object included in the target virtual gift, the control component being provided for controlling a path of the target virtual gift;
the processing module 403 is further provided for determining, in accordance with a state of the control component, a target path corresponding to the first object; and controlling the first object to move along the target path;
the display module 401 is also provided for displaying movement of the first object along the target path, wherein if the first object hits the second object during movement, playing a first effect corresponding to the second object at a position where the second object is hit.

In some embodiments, the processing module 403 is specifically provided for determining the target path according to the path indicated by the control component.

In some embodiments, the receiving module 402 is further provided for receiving a first trigger operation for the control component; the processing module 403 is provided for updating the path indicated by the control component; and the display module 401 is further provided for displaying the updated path.

In some embodiments, the receiving module 402 is also provided for receiving a second trigger operation for the control component; the processing module 403 is provided for controlling the first object to move along the target path; and the display module 401 is used for displaying the movement of the first object along the target path.

In some embodiments, the processing module 403 is further provided for, on the basis that the control component has not received a trigger operation for a preset time interval, controlling the first object to move along the target path; the display module 401 is also provided for displaying movement of the first object along the target path.

In some embodiments, if the first object, when moving along the target path, fails to hit the second object, the display module 401 is further provided for playing a second effect at a preset position.

In some embodiments, the processing module 403 is also provided for acquiring an offset angle between the target path and a reference path, wherein the reference path is determined according to a connecting line between the second object and a starting point of the target path; and acquiring the second effect corresponding to the offset angle in accordance with the offset angle.

Correspondingly, the display module 401 is specifically used for playing the second effect corresponding to the offset angle.

In some embodiments, before controlling the first object to move along the target path, the receiving module 402 is further provided for receiving an operation for triggering a style entry tag in the virtual gift display interface; correspondingly, the display module 401 is also provided for displaying a style display interface, wherein the style display interface includes one or more styles corresponding to the target virtual gift.

The receiving module 402 is further provided for receiving an operation for triggering a target style in the style display interface; correspondingly, the processing module 403 is also provided for switching a style of the target virtual gift into the target style; and the display module 401 is used for displaying the target style.

In some embodiments, display parameters of the second object within a hittable range of the first object differ from display parameters of the second object outside the hittable range of the first object.

In some embodiments, the display parameters include: one or more of brightness, size, hue, saturation and animation effect.

The apparatus for interactions provided by this embodiment may be provided for implementing the technical solution of any of the above method embodiments. The implementation principle and the technical effect are similar to the method embodiments and may refer to the detailed description of the above method claims, and will not be repeated here for conciseness.

Figure 5:
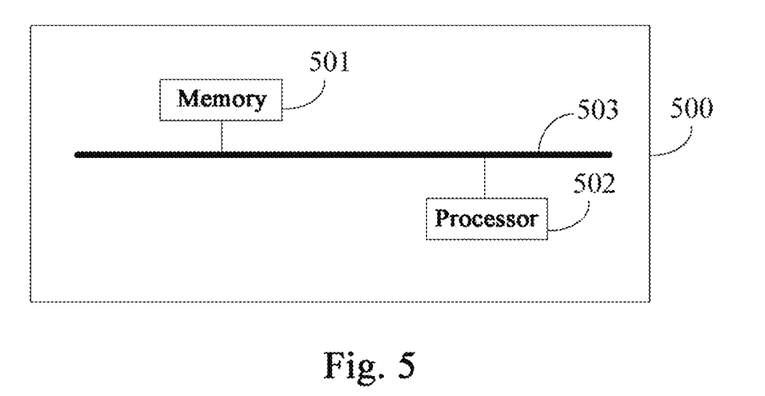
FIG. 5 is a structural diagram of an electronic device provided by some embodiments of the present disclosure.

FIG. 5 is a structural diagram of the electronic device provided by one embodiment of the present disclosure. With reference to FIG. 5, the electronic device 500 provided by this embodiment comprises: a memory 501 and a processor 502.

The memory 501 is an independent physical unit connected to the processor 502 via the bus 503. The memory 501 and the processor 502 may be integrated and implemented by hardware.

The memory 501 is used for storing program instructions while the processor 502 calls the program instructions to execute the technical solution of any of the above method embodiments.

Optionally, when the method of the above embodiment is partly or fully implemented by software, the above electronic device 500 may only include the processor 502. The memory 501 for storing the programs may be independent of the electronic device 500, and the processor 502 is connected to the memory via the circuit/wire for reading and executing programs stored in the memory.

The processor 502 may be a central processing unit (CPU), a network processor (NP) or a combination thereof.

The processor 502 may further include a hardware chip. The above hardware chip may be Application-specific Integrated Circuit (ASIC), Programmable logic device (PLD) or a combination thereof. The above PLD may be Complex Programmable Logic Device (CPLD), Field-Programmable Gate Array (FPGA), Generic Array Logic (GAL) or any combinations thereof.

The memory 501 may include volatile memory, e.g., Random-Access Memory (RAM); the memory may include non-volatile memory, such as flash memory, hard disk drive (HDD) or solid-state drive (SSD); the memory may include a combination of the above types of memory.

As an example, the present disclosure provides a chip system applied to an electronic device including the memory and the sensor; the chip system comprises: a processor executing the method for interactions according to the previous embodiments.

As an example, the present disclosure provides a computer readable storage medium stored with computer programs thereon, the computer programs, when executed by the processor, causing the electronic device to perform the method for interactions according to the previous embodiments.

In the above embodiments, the functions may be fully or partly implemented by software, hardware or combinations thereof. When the functions are fulfilled by software, they may be fully or partly implemented in the form of computer program products. The computer program products include one or more computer instructions. When the computer instructions are loaded or executed on the computers, all or part of the flows or functions according to the embodiments of the present disclosure may be generated. The computer may be general-purpose computer, dedicated computer, computer network or other programmable apparatus. The computer instructions may be stored in the computer readable medium, which may be any available medium accessible by the computer or a data storage device containing one or more available media, such as integrated server or data center etc. The available media may be magnetic media (e.g., floppy disk, hard disk, magnetic tape and the like), optical media (such as DVD) or semiconductor media (such as solid state disk and SSD).

It is to be noted that relation terms such as "first" and "second" in the text are only used for distinguishing one entity or operation from a further entity or operation, without requiring or suggesting any actual relations or sequences between these entities or operations. Besides, the terms "comprising", "containing" or other variants indicate non-exclusive inclusion, such that the process, method, object or device including a series of elements also include other elements not listed in addition to those elements; alternatively, it may include elements inherent in the process, method, object or device. Without more limitations, the process, method, object or device including the elements defined by the expression of "comprising/including one . . . " may contain other same elements.

The above is just the specific implementations of the present disclosure, which are provided for those skilled in the art to understand or implement the present disclosure. Many modifications to the embodiments are obvious for those skilled in the art. General principles defined in the text may be implemented in other embodiments without deviating from the spirit or scope of the present disclosure. Therefore, the present disclosure will not be restricted to the embodiments disclosed herein and instead has a broadest scope consistent with the principles and novel features disclosed here.

The invention claimed is:

1. An interaction method comprising:
during a process of playing a multimedia content, in response to a trigger operation for a target virtual gift in a virtual gift display interface, displaying a control component, a first object and a plurality of second objects, the first object and the plurality of second objects being included in the target virtual gift, the control component being configured to control a path of the target virtual gift, wherein each second object has a corresponding different effect that is triggered to display after interacting with the first object;
determining, in accordance with a state of the control component, a target path corresponding to the first object; and
controlling the first object to move along the target path, wherein if the first object interacts with a first one of the second objects during movement, a first effect corresponding to the first one of the second objects that interacts with the first object is played, and if the first object interacts with a second one of the second objects during movement, a second effect corresponding to the second one of the second objects that interacts with the first object is played, wherein the first effect is different from the second effect.

2. The method of claim 1, wherein determining, in accordance with the state of the control component, the target path corresponding to the first object comprises:
determining the target path according to a path indicated by the control component.

3. The method of claim 2, wherein before determining the target path according to the path indicated by the control component, the method further comprises:
in response to a first trigger operation on the control component, updating the path indicated by the control component.

4. The method of claim 1, wherein controlling the first object to move along the target path comprises:
in response to a second trigger operation on the control component, controlling the first object to move along the target path; or
on a basis that the control component has not received a trigger operation for a preset time interval, controlling the first object to move along the target path.

5. The method of claim 1, further comprising:
if the first object, when moving along the target path, fails to hit any of the second objects, playing the second effect at a preset position.

6. The method of claim 5, wherein playing the second effect at the preset position comprises:
acquiring an offset angle between the target path and a reference path, wherein the reference path is determined according to a connecting line between a second object and a starting point of the target path; and
acquiring the second effect corresponding to the offset angle in accordance with the offset angle and playing the second effect at the preset position.

7. The method of claim 1, wherein before the controlling the first object to move along the target path, the method further comprises:
in response to an operation for triggering a style entry tag in the virtual gift display interface, displaying a style display interface including one or more styles corresponding to the target virtual gift; and
in response to an operation for triggering a target style in the style display interface, switching a style of the target virtual gift into the target style.

8. The method of claim 1, wherein display parameters of the second objects within a hittable range by the first object differ from that of the second objects outside the hittable range by the first object.

9. The method of claim 8, wherein the display parameters include one or more of brightness, size, hue, saturation and animation effect.

10. The method of claim 1, wherein the interaction with the second object comprises a hit on the second object, and wherein the first effect corresponding to the second object is played at a position where the second object is hit.

11. An electronic device, comprising:
a processor; and
a memory having computer program instructions stored thereon which, when executed by the processor, cause the electronic device to perform acts comprising:
during a process of playing a multimedia content, in response to a trigger operation for a target virtual gift in a virtual gift display interface, displaying a control component, a first object and a plurality of second objects, the first object and the plurality of second objects being included in the target virtual gift, the control component being configured to control a path of the target virtual gift, wherein each second object has a corresponding different effect that is triggered to display after interacting with the first object;
determining, in accordance with a state of the control component, a target path corresponding to the first object; and
controlling the first object to move along the target path, wherein if the first object interacts with a first one of the second objects during movement, a first effect corresponding to the first one of the second objects that interacts with the first object is played, and if the first object interacts with a second one of the second objects during movement, a second effect corresponding to the second one of the second objects that interacts with the first object is played, wherein the first effect is different from the second effect.

12. The electronic device of claim 11, wherein determining, in accordance with the state of the control component, the target path corresponding to the first object comprises:
determining the target path according to a path indicated by the control component.

13. The electronic device of claim 12, wherein before determining the target path according to the path indicated by the control component, the acts further comprise:
in response to a first trigger operation on the control component, updating the path indicated by the control component.

14. The electronic device of claim 11, wherein controlling the first object to move along the target path comprises:
in response to a second trigger operation on the control component, controlling the first object to move along the target path; or
on a basis that the control component has not received a trigger operation for a preset time interval, controlling the first object to move along the target path.

15. The electronic device of claim 11, the acts further comprising:
if the first object, when moving along the target path, fails to hit any of the second objects, playing the second effect at a preset position.

16. The electronic device of claim 15, wherein playing the second effect at the preset position comprises:
acquiring an offset angle between the target path and a reference path, wherein the reference path is determined according to a connecting line between a second object and a starting point of the target path; and
acquiring the second effect corresponding to the offset angle in accordance with the offset angle and playing the second effect at the preset position.

17. The electronic device of claim 11, wherein before the controlling the first object to move along the target path, the acts further comprise:
in response to an operation for triggering a style entry tag in the virtual gift display interface, displaying a style display interface including one or more styles corresponding to the target virtual gift; and
in response to an operation for triggering a target style in the style display interface, switching a style of the target virtual gift into the target style.

18. The electronic device of claim 11, wherein display parameters of the second objects within a hittable range by the first object differ from that of the second objects outside the hittable range by the first object.

19. The electronic device of claim 18, wherein the display parameters include one or more of brightness, size, hue, saturation and animation effect.

20. A non-transitory readable storage medium comprising computer program instructions which, when executed by at least one processor of an electronic device, cause the electronic device to perform acts comprising:
during a process of playing a multimedia content, in response to a trigger operation for a target virtual gift in a virtual gift display interface, displaying a control component, a first object and a plurality of second objects, the first object and the plurality of second objects being included in the target virtual gift, the control component being configured to control a path of the target virtual gift, wherein each second object has a corresponding different effect that is triggered to display after interacting with the first object;
determining, in accordance with a state of the control component, a target path corresponding to the first object; and
controlling the first object to move along the target path, wherein if the first object interacts with a first one of the second objects during movement, a first effect corresponding to the first one of the second objects that interacts with the first object is played, and if the first object interacts with a second one of the second objects during movement, a second effect corresponding to the second one of the second objects that interacts with the first object is played, wherein the first effect is different from the second effect.

* * * * *